United States Patent
Anneaux et al.

(10) Patent No.: US 9,856,588 B2
(45) Date of Patent: Jan. 2, 2018

(54) ELECTROSPINNING OF PTFE

(71) Applicant: Zeus Industrial Products, Inc., Orangeburg, SC (US)

(72) Inventors: Bruce L. Anneaux, Lexington, SC (US); Robert L. Ballard, Orangeburg, SC (US); David P. Garner, Lexington, SC (US)

(73) Assignee: Zeus Industrial Products, Inc., Orangeburg, SC (US)

( * ) Notice: Subject to any disclaimer, the term of this patent is extended or adjusted under 35 U.S.C. 154(b) by 0 days.

(21) Appl. No.: 14/636,274

(22) Filed: Mar. 3, 2015

(65) Prior Publication Data
US 2015/0183940 A1 Jul. 2, 2015

Related U.S. Application Data

(63) Continuation of application No. 13/446,300, filed on Apr. 13, 2012, which is a continuation of application
(Continued)

(51) Int. Cl.
*C08J 3/05* (2006.01)
*C08L 27/18* (2006.01)
(Continued)

(52) U.S. Cl.
CPC ............ *D04H 1/728* (2013.01); *B05D 1/007* (2013.01); *B29B 11/06* (2013.01); *B29B 13/023* (2013.01);
(Continued)

(58) Field of Classification Search
USPC .......................................... 524/544; 523/201
See application file for complete search history.

(56) References Cited

U.S. PATENT DOCUMENTS

| | | |
|---|---|---|
| 2,158,416 A | 5/1939 | Formhals |
| 4,043,331 A | 8/1977 | Martin et al. |

(Continued)

FOREIGN PATENT DOCUMENTS

| | | |
|---|---|---|
| CN | 101003917 A | 7/2007 |
| CN | 101350413 | 1/2009 |

(Continued)

OTHER PUBLICATIONS

Non-Final Office Action dated Feb. 5, 2016, in U.S. Appl. No. 13/749,823.
(Continued)

*Primary Examiner* — Mark Kaucher
*Assistant Examiner* — Henry Hu
(74) *Attorney, Agent, or Firm* — Louis Isaf; Womble Bond Dickinson (US) LLP

(57) ABSTRACT

An improved process for forming a PTFE mat is described. The process includes providing a dispersion with PTFE, a fiberizing polymer and a solvent wherein said dispersion has a viscosity of at least 50,000 cP. An apparatus is provided which comprises a charge source and a target a distance from the charge source. A voltage source is provided which creates a first charge at the charge source and an opposing charge at the target. The dispersion is electrostatically charged by contact with the charge source. The electrostatically charged dispersion is collected on the target to form a mat precursor which is heated to remove the solvent and the fiberizing polymer thereby forming the PTFE mat.

16 Claims, 2 Drawing Sheets

Related U.S. Application Data

No. 12/689,334, filed on Jan. 19, 2010, now Pat. No. 8,178,030.

(60) Provisional application No. 61/145,309, filed on Jan. 16, 2009, provisional application No. 61/256,349, filed on Oct. 30, 2009.

(51) Int. Cl.

| | | |
|---|---|---|
| D04H 1/728 | (2012.01) | |
| D01D 5/00 | (2006.01) | |
| D01D 10/02 | (2006.01) | |
| D01F 6/12 | (2006.01) | |
| D01F 6/48 | (2006.01) | |
| D04H 1/42 | (2012.01) | |
| D04H 1/4326 | (2012.01) | |
| D04H 3/02 | (2006.01) | |
| B05D 1/00 | (2006.01) | |
| B32B 1/08 | (2006.01) | |
| B32B 5/02 | (2006.01) | |
| B32B 9/00 | (2006.01) | |
| B32B 15/085 | (2006.01) | |
| B32B 27/08 | (2006.01) | |
| D04H 1/4318 | (2012.01) | |
| C08J 3/00 | (2006.01) | |
| B29B 13/02 | (2006.01) | |
| C08J 9/232 | (2006.01) | |
| D06N 7/00 | (2006.01) | |
| B29B 11/06 | (2006.01) | |
| B29C 55/04 | (2006.01) | |
| D04H 1/4382 | (2012.01) | |
| D04H 1/54 | (2012.01) | |
| D04H 1/74 | (2006.01) | |
| C08F 114/26 | (2006.01) | |
| D04H 1/413 | (2012.01) | |
| B29K 27/18 | (2006.01) | |
| B29L 31/00 | (2006.01) | |
| B29K 105/00 | (2006.01) | |

(52) U.S. Cl.
CPC ............... *B29C 55/04* (2013.01); *B32B 1/08* (2013.01); *B32B 5/022* (2013.01); *B32B 9/005* (2013.01); *B32B 15/085* (2013.01); *B32B 27/08* (2013.01); *C08F 114/26* (2013.01); *C08J 3/005* (2013.01); *C08J 3/05* (2013.01); *C08J 9/232* (2013.01); *D01D 5/003* (2013.01); *D01D 5/0007* (2013.01); *D01D 5/0038* (2013.01); *D01D 10/02* (2013.01); *D01F 6/12* (2013.01); *D01F 6/48* (2013.01); *D04H 1/413* (2013.01); *D04H 1/42* (2013.01); *D04H 1/4318* (2013.01); *D04H 1/4326* (2013.01); *D04H 1/4382* (2013.01); *D04H 1/54* (2013.01); *D04H 1/74* (2013.01); *D04H 3/02* (2013.01); *D06N 7/00* (2013.01); *B29K 2027/18* (2013.01); *B29K 2105/0094* (2013.01); *B29K 2995/0063* (2013.01); *B29K 2995/0077* (2013.01); *B29L 2031/755* (2013.01); *C08J 2327/18* (2013.01); *C08J 2471/02* (2013.01); *D10B 2321/042* (2013.01); *Y10T 428/1314* (2015.01); *Y10T 428/1355* (2015.01); *Y10T 428/1362* (2015.01); *Y10T 442/60* (2015.04); *Y10T 442/656* (2015.04); *Y10T 442/674* (2015.04); *Y10T 442/681* (2015.04)

(56) References Cited

U.S. PATENT DOCUMENTS

| | | |
|---|---|---|
| 4,044,404 A * | 8/1977 | Martin ............... A61L 15/24 19/296 |
| 4,096,227 A | 6/1978 | Gore |
| 4,127,706 A | 11/1978 | Martin et al. |
| 4,143,196 A | 3/1979 | Simm et al. |
| 4,287,139 A | 9/1981 | Guignard |
| 4,323,525 A | 4/1982 | Bornat |
| 4,432,916 A | 2/1984 | Logan |
| 4,552,707 A | 11/1985 | How |
| 4,689,186 A | 8/1987 | Bornat |
| 5,234,739 A | 8/1993 | Tanaru et al. |
| 5,324,785 A | 6/1994 | Noda et al. |
| 5,328,946 A | 7/1994 | Tuminello et al. |
| 5,344,297 A | 9/1994 | Hills |
| 5,476,589 A | 12/1995 | Bacino |
| 5,509,902 A | 4/1996 | Raulerson |
| 5,562,986 A | 10/1996 | Yamamoto et al. |
| 5,665,428 A | 9/1997 | Cha et al. |
| 5,700,572 A | 12/1997 | Klatt et al. |
| 5,702,658 A | 12/1997 | Pellegrin et al. |
| 5,741,333 A | 4/1998 | Frid |
| 5,806,633 A | 9/1998 | Macuga |
| 5,912,077 A | 6/1999 | Tamaru et al. |
| 6,001,125 A | 12/1999 | Golds et al. |
| 6,075,180 A | 6/2000 | Sharber et al. |
| 6,133,165 A | 10/2000 | Tamaru et al. |
| 6,175,571 B1 | 1/2001 | Haddock et al. |
| 6,265,333 B1 | 7/2001 | Dzenis et al. |
| 6,416,896 B1 | 7/2002 | Tamaru et al. |
| 6,436,135 B1 | 8/2002 | Goldfarb |
| 6,488,701 B1 | 12/2002 | Nolting et al. |
| 6,498,207 B1 | 12/2002 | Hoshikawa et al. |
| 6,641,773 B2 | 11/2003 | Kleinmeyer et al. |
| 6,679,913 B2 | 1/2004 | Homsy |
| 6,737,165 B1 | 5/2004 | Smith et al. |
| 6,743,273 B2 | 6/2004 | Chung et al. |
| 6,790,225 B1 | 9/2004 | Shannon et al. |
| 6,863,852 B1 | 3/2005 | Ballard et al. |
| 7,083,697 B2 | 8/2006 | Dao et al. |
| 7,108,912 B2 | 9/2006 | Huang et al. |
| 7,115,220 B2 | 10/2006 | Dubson et al. |
| 7,244,272 B2 | 7/2007 | Dubson et al. |
| 7,306,729 B2 | 12/2007 | Bacino et al. |
| 7,316,754 B2 | 1/2008 | Ide et al. |
| 7,413,575 B2 | 8/2008 | Phaneuf et al. |
| 7,416,559 B2 | 8/2008 | Shalaby |
| 7,485,141 B2 | 2/2009 | Marercak et al. |
| 7,524,527 B2 | 4/2009 | Stenzel |
| 7,582,240 B2 | 9/2009 | Marin et al. |
| 7,799,261 B2 | 9/2010 | Orr et al. |
| 7,857,608 B2 | 12/2010 | Fabbricante et al. |
| 7,872,073 B2 | 1/2011 | Jones |
| 7,947,069 B2 | 5/2011 | Sanders |
| 7,981,353 B2 | 7/2011 | Mitchell et al. |
| 8,178,030 B2 | 5/2012 | Anneaux et al. |
| 8,257,640 B2 | 9/2012 | Anneaux et al. |
| 8,262,979 B2 | 9/2012 | Anneaux et al. |
| 8,637,144 B2 | 1/2014 | Ford |
| 8,658,707 B2 | 2/2014 | Xu et al. |
| 8,691,543 B2 | 4/2014 | Gaudette et al. |
| 8,771,582 B2 | 7/2014 | Phaneuf et al. |
| 2001/0049551 A1 | 12/2001 | Tseng et al. |
| 2002/0192468 A1 | 12/2002 | Choi |
| 2002/0198588 A1 | 12/2002 | Armstrong et al. |
| 2003/0008944 A1 | 1/2003 | Jones et al. |
| 2003/0040772 A1 | 2/2003 | Hyodoh et al. |
| 2003/0044559 A1* | 3/2003 | Liu ............... C09J 7/0207 428/40.1 |
| 2003/0044585 A1 | 3/2003 | Taylor et al. |
| 2003/0060871 A1 | 3/2003 | Hill et al. |
| 2003/0069343 A1 | 4/2003 | Smith et al. |
| 2003/0074049 A1 | 4/2003 | Hoganson et al. |
| 2003/0100944 A1 | 5/2003 | Laksin et al. |
| 2003/0114917 A1 | 6/2003 | Holloway et al. |
| 2003/0195611 A1 | 10/2003 | Greenhalgh et al. |

(56) References Cited

U.S. PATENT DOCUMENTS

| | | |
|---|---|---|
| 2003/0211135 A1 | 11/2003 | Greenhalgh et al. |
| 2004/0016260 A1 | 1/2004 | Kobayashi et al. |
| 2004/0030377 A1 | 2/2004 | Dubson et al. |
| 2004/0051201 A1 | 3/2004 | Greenhalgh et al. |
| 2004/0054397 A1 | 3/2004 | Smith et al. |
| 2004/0093070 A1 | 5/2004 | Hojeibane et al. |
| 2005/0025974 A1 | 2/2005 | Lennhoff |
| 2005/0053782 A1 | 3/2005 | Sen et al. |
| 2005/0113868 A1 | 5/2005 | Devellian et al. |
| 2005/0137675 A1 | 6/2005 | Dubson et al. |
| 2005/0143494 A1* | 6/2005 | Jones ............... C08L 27/18 523/201 |
| 2005/0149170 A1 | 7/2005 | Tassel et al. |
| 2005/0187605 A1 | 8/2005 | Greenhalgh et al. |
| 2005/0244453 A1 | 11/2005 | Stucke et al. |
| 2005/0278018 A1 | 12/2005 | Jensen |
| 2006/0200232 A1 | 9/2006 | Phaneuf et al. |
| 2006/0213829 A1* | 9/2006 | Rutledge ............ D01D 5/0007 210/503 |
| 2006/0246798 A1 | 11/2006 | Reneker et al. |
| 2007/0026036 A1 | 2/2007 | Falotico et al. |
| 2007/0031607 A1 | 2/2007 | Dubson et al. |
| 2007/0043428 A1 | 2/2007 | Jennings et al. |
| 2007/0087027 A1 | 4/2007 | Greenhalgh et al. |
| 2007/0132130 A1 | 6/2007 | Roberts |
| 2007/0207179 A1 | 9/2007 | Andersen et al. |
| 2007/0207186 A1 | 9/2007 | Scanlon et al. |
| 2007/0244569 A1 | 10/2007 | Weber et al. |
| 2007/0276477 A1 | 11/2007 | Lee et al. |
| 2008/0021545 A1 | 1/2008 | Reneker et al. |
| 2008/0029617 A1 | 2/2008 | Marshall et al. |
| 2008/0038976 A1 | 2/2008 | Berrigan et al. |
| 2008/0119943 A1 | 5/2008 | Armstrong et al. |
| 2008/0199506 A1 | 8/2008 | Horres et al. |
| 2008/0208323 A1 | 8/2008 | El-Kurdi et al. |
| 2008/0208325 A1 | 8/2008 | Helmus et al. |
| 2008/0242171 A1 | 10/2008 | Huang et al. |
| 2008/0254091 A1 | 10/2008 | Lee et al. |
| 2008/0261043 A1 | 10/2008 | Greiner et al. |
| 2008/0264259 A1 | 10/2008 | Leung |
| 2008/0296808 A1 | 12/2008 | Joo et al. |
| 2009/0012607 A1 | 1/2009 | Kim et al. |
| 2009/0018643 A1 | 1/2009 | Hashi et al. |
| 2009/0088828 A1 | 4/2009 | Shalev et al. |
| 2009/0136651 A1 | 5/2009 | Larsen et al. |
| 2009/0160099 A1 | 6/2009 | Huang |
| 2009/0163994 A1 | 6/2009 | Quigley et al. |
| 2009/0227165 A1 | 9/2009 | Imai |
| 2009/0233057 A1 | 9/2009 | Aksay et al. |
| 2009/0248131 A1 | 10/2009 | Greenan |
| 2009/0258958 A1 | 10/2009 | Ford |
| 2009/0280325 A1 | 11/2009 | Lozano et al. |
| 2009/0324950 A1 | 12/2009 | Kim |
| 2010/0013126 A1 | 1/2010 | Ishaque et al. |
| 2010/0093093 A1 | 4/2010 | Leong et al. |
| 2010/0107881 A1 | 5/2010 | Healey et al. |
| 2010/0190254 A1 | 7/2010 | Chian et al. |
| 2010/0194000 A1 | 8/2010 | Petras et al. |
| 2010/0248324 A1 | 9/2010 | Xu et al. |
| 2010/0304205 A1 | 12/2010 | Jo et al. |
| 2010/0331965 A1 | 12/2010 | Dugas et al. |
| 2011/0022159 A1 | 1/2011 | Fierens et al. |
| 2011/0030885 A1 | 2/2011 | Anneaux et al. |
| 2011/0031656 A1 | 2/2011 | Anneaux et al. |
| 2011/0089603 A1 | 4/2011 | Fabbricante et al. |
| 2011/0135806 A1 | 6/2011 | Grewe et al. |
| 2011/0142804 A1 | 6/2011 | Gaudette et al. |
| 2011/0156319 A1 | 6/2011 | Kurokawa et al. |
| 2012/0114722 A1 | 5/2012 | Ballard et al. |
| 2013/0085565 A1 | 4/2013 | Eller et al. |
| 2013/0184808 A1 | 7/2013 | Hall et al. |
| 2013/0184810 A1 | 7/2013 | Hall et al. |
| 2013/0189464 A1 | 7/2013 | Ford |
| 2014/0067047 A1 | 3/2014 | Eller et al. |
| 2014/0072694 A1 | 3/2014 | Hall et al. |
| 2014/0074225 A1 | 3/2014 | Hall et al. |
| 2014/0079758 A1 | 3/2014 | Hall et al. |
| 2014/0081414 A1 | 3/2014 | Hall et al. |
| 2014/0086971 A1 | 3/2014 | Hall et al. |
| 2014/0248418 A1 | 9/2014 | Eller et al. |
| 2014/0249619 A1 | 9/2014 | Eller et al. |
| 2014/0273703 A1 | 9/2014 | Mower et al. |

FOREIGN PATENT DOCUMENTS

| | | |
|---|---|---|
| CN | 101530750 A | 9/2009 |
| CN | 103561682 A | 2/2014 |
| EP | 0 005 035 | 10/1979 |
| EP | 2 223 725 | 9/2010 |
| EP | 2 363 516 | 9/2011 |
| GB | 1 530 990 | 11/1978 |
| GB | 2 015 118 | 9/1979 |
| JP | 51-60773 | 5/1976 |
| JP | 54-151675 | 11/1979 |
| JP | 02-571379 B2 | 10/1996 |
| JP | 2006-326579 | 12/2006 |
| JP | 2007-224466 | 9/2007 |
| KR | 10-0820162 B1 | 4/2008 |
| KR | 10-0845239 B1 | 7/2008 |
| KR | 10-2012-0116640 | 10/2012 |
| WO | WO 2005/018600 | 3/2005 |
| WO | WO 2005/095684 A1 | 10/2005 |
| WO | WO 2007/145283 A1 | 12/2007 |
| WO | WO 2008/022993 | 2/2008 |
| WO | WO 2008/109116 | 9/2008 |
| WO | WO 2009/018463 | 2/2009 |
| WO | WO 2009/127170 | 10/2009 |
| WO | WO 2010/083530 | 7/2010 |
| WO | WO 2010/132636 | 11/2010 |
| WO | WO 2011/017698 | 2/2011 |
| WO | WO 2012/103501 | 8/2012 |
| WO | WO 2012/103501 A1 | 8/2012 |
| WO | WO 2013/109528 | 7/2013 |
| WO | WO 2014/007979 | 1/2014 |
| WO | WO 2014/047065 | 3/2014 |
| WO | WO 2014/047379 | 3/2014 |

OTHER PUBLICATIONS

Amendment & Response to Office Action filed with the USPTO on Feb. 2, 2016, in U.S. Appl. No. 13/742,077.

Amendment & Response to Office Action filed with the USPTO on Feb. 9, 2016, in U.S. Appl. No. 14/044,050.

Final Office Action dated Feb. 22, 2016, in U.S. Appl. No. 13/742,077.

Non-Final Office Action dated Feb. 16, 2016, in U.S. Appl. No. 14/918,877.

U.S. Appl. No. 13/787,327, filed Mar. 6, 2013, Hall et al.

U.S. Appl. No. 13/826,618, filed Mar. 14, 2013, Hall et al.

U.S. Appl. No. 13/827,775, filed Mar. 14, 2013, Lampropoulos et al.

U.S. Appl. No. 13/829,452, filed Mar. 14, 2013, Hall et al.

PCT International Search Report from PCT/US10/021246, dated Aug. 16, 2010.

Notification of Transmittal of the International Search Report & The Written Opinion of the International Searching Authority, or the Declatation dated Oct. 7, 2010, from PCT Application No. PCT/US10/0044874.

Notification of Transmittal of the International Search Report & The Written Opinion of the International Searching Authority, or the Declatation dated Oct. 7, 2010, from PCT Application No. PCT/US10/0044879.

Kim et al., "Structural Studies of Electrospun Cellulose Nanofibers," Polymer, 2006, pp. 5097-5107, vol. 47.

Written Opinion of the International Searching Authority, PCT/US2010/021426, dated Aug. 12, 2010, Won Jae Lee.

Office Action from corresponding Chinese Patent Application No. 201080004845.8, dated Nov. 5, 2012 (Good Faith Translation).

International Search Report and Written Opinion dated May 23, 2012 for PCT/US2012/023006.

(56) References Cited

OTHER PUBLICATIONS

Preparation of polytetrafluoroethylene ultrafine fiber mats with electrospinning process; Sijun et al.; Materials Science Forum vols. 675-677 (2011); pp. 827-830.
Office Action dated May 9, 2014 from U.S. Appl. No. 13/360,444, filed Jan. 27, 2012.
Response to May 9, 2014 Office Action filed Aug. 11, 2014 from U.S. Appl. No. 13/360,444, filed Jan. 27, 2012.
Office Action dated Jul. 2, 2014 from U.S. Appl. No. 14/044,050, filed Oct. 2, 2013.
Office Action dated Aug. 29, 2014 from U.S. Appl. No. 14/152,590, filed Jan. 10, 2014.
Office Action dated Mar. 3, 2014 from U.S. Appl. No. 13/742,025, filed Jan. 15, 2013.
Response to Mar. 3, 2014 Office Action filed Jun. 19, 2014 from U.S. Appl. No. 13/742,025, filed Jan. 15, 2013.
Office Action dated Sep. 22, 2014 from U.S. Appl. No. 13/787,327, filed Mar. 6, 2013.
Japanese Office Action dated Sep. 30, 2014, from corresponding Japanese patent application No. 2013-126693, filed Jun. 17, 2013.
U.S. Office Action dated Oct. 10, 2014, from U.S. Appl. No. 13/742,025, filed Jan. 15, 2013.
Role of chain entanglements on fiber formation during electrospinning of polymer solutions: good solvent, non-specific polymer-polymer interaction limit—Shenoy et al.—Science Direct (2005)—pp. 3372-3384.
Response to Aug. 29, 2014 Non-Final Office Action, filed with USPTO on Nov. 25, 2014, from U.S. Appl. No. 14/152,590, filed Jan. 10, 2014.
European Search Report dated Aug. 19, 2014 for EP12755426.9.
U.S. Office Action dated Feb. 4, 2015, for U.S. Appl. No. 13/360,444, filed Jan. 27, 2012.
International Preliminary Report on Patentability for PCT Application No. PCT/US2012/023006, filed Jan. 27, 2012.
International Search Report for PCT Application No. PCT/US2012/023006, filed Jan. 27, 2012.
C.A. Sperati and H.W. Starkweather, Fortschr. Hochmpolym. Forsch, 1961, p. 465-495.
S.V. Gandal and Brothers, Encyclopedia of Polymer Science and Technology, 2010, section Perfluorinated Polymers, Polytetrafluoroethylene.
Jyoti Lochab and V R. Singh, Indian Journal of Pure & Applied Physics, vol. 42, Aug. 2004, p. 595-599.
Office Action dated Mar. 18, 2015, from corresponding U.S. Appl. No. 13/564,925.
Office Action dated Mar. 13, 2015, from corresponding U.S. Appl. No. 14/331,375.
Non-Final Office Action dated Nov. 20, 2015, in U.S. Appl. No. 13/826,618.
Amendment and Response to Office Action filed Nov. 30, 2015 in U.S. Appl. No. 14/152,626.
Non-Final Office Action dated Nov. 30, 2015, in U.S. Appl. No. 14/175,016.
RCE and Amendment B and Response to Final Office Action filed Nov. 20, 2015 in U.S. Appl. No. 13/446,300.
Response to Office Action filed May 4, 2016, in U.S. Appl. No. 13/749,823.
Response to Office Action filed Apr. 11, 2016, in U.S. Appl. No. 14/152,590.
Chinese Office Action dated Apr. 25, 2016, in Chinese patent application No. 201380017906.8 (including translation).
Chinese Office Action dated Feb. 24, 2016, in Chinese patent application No. 201410312160X (including translation).
Amendment and Response to Office Action filed May 18, 2016 in U.S. Appl. No. 14/081,504.
RCE and Amendment and Response to Final Office Action filed May 23, 2016 in U.S. Appl. No. 13/742,077.
RCE and Amendment and Response to Final Office Action filed May 23, 2016 in U.S. Appl. No. 14/152,626.
Office Action dated Feb. 24, 2016 in co-pending CN Application No. 201410312160X.
Supplemental Amendment filed Jun. 20, 2016, for U.S. Appl. No. 13/826,618.
Non-Final Office Action dated Jun. 20, 2016 for U.S. Appl. No. 14/348,309.
Non-Final Office Action dated Jun. 9, 2016 for U.S. Appl. No. 14/152,626.
Final Office Action dated Jun. 8, 2016 for U.S. Appl. No. 14/044,050.
Amendment B and Response to Office Action filed Jun. 13, 2016 for U.S. Appl. No. 14/331,400.
Non-Final Office Action dated Jun. 10, 2016 for U.S. Appl. No. 13/749,823.
Final Office Action dated Jun. 16, 2016 for U.S. Appl. No. 14/175,016.
Non-Final Office Action dated Jun. 30, 2016 for U.S. Appl. No. 14/081,715.
Response to Non-Final Office Action filed Jun. 28, 2016 for U.S. Appl. No. 13/827,790.
Supplemental Amendment filed Jun. 28, 2016 for U.S. Appl. No. 13/742,077.
Non-Final Office Action dated May 11, 2015, from corresponding U.S. Appl. No. 14/331,400.
DuPont TM Teflon PTFE 601A, Product Information. Copyright 2005.
Statement of Substance of Telephone Interview dated Mar. 12, 2012 in U.S. Appl. No. 12/689,334.
Applicant-Initiated Interview Summary dated Mar. 6, 2012 in U.S. Appl. No. 12/689,334.
Non-Final Office Action dated Feb. 16, 2012 in U.S. Appl. No. 12/689,334.
Non-Final Office Action dated Mar. 23, 2011 in U.S. Appl. No. 12/689,334.
Response dated Feb. 28, 2012 to Non-Final Office Action in U.S. Appl. No. 12/689,334.
Response dated May 9, 2011 to Non-Final Office Action in U.S. Appl. No. 12/689,334.
Amendment under 37 C.F.R. 1.312 dated Jul. 23, 2012 in U.S. Appl. No. 12/852,989.
Non-Final Office Action dated Feb. 13, 2012 in U.S. Appl. No. 12/852,989.
Response dated Apr. 26, 2012 to Non-Final Office Action in U.S. Appl. No. 12/852,989.
Amendment under 37 C.F.R. 1.312 dated Jul. 23, 2012 in U.S. Appl. No. 12/825,993.
Non-Final Office Action dated Feb. 9, 2012 in U.S. Appl. No. 12/852,993.
Response dated May 3, 2012 to Non-Final Office Action in U.S. Appl. No. 12/852,993.
Non-Final Office Action dated Nov. 2, 2012 in U.S. Appl. No. 13/272,412.
Response dated Aug. 5, 2013 to Non-Final Office Action in U.S. Appl. No. 13/272,412.
Response dated Feb. 1, 2013 to Non-Final Office Action in U.S. Appl. No. 13/272,412.
Non-Final Office Action dated May 3, 2013 in U.S. Appl. No. 13/272,412.
Non-Final Office Action dated Mar. 18, 2015 in U.S. Appl. No. 13/564,925.
Advisory Action dated Nov. 18, 2014 in U.S. Appl. No. 13/564,927.
Final Rejection dated Sep. 3, 2014 in U.S. Appl. No. 13/564,927.
Applicant-Initiated Interview Summary dated Nov. 13, 2014 in U.S. Appl. No. 13/564,927.
Non-Final Office Action dated Mar. 21, 2014 in U.S. Appl. No. 13/564,927.
Response dated Jun. 19, 2014 to Non-Final Office Action in U.S. Appl. No. 13/564,927.
Response dated Nov. 4, 2014 to Final Rejection in U.S. Appl. No. 13/564,927.
Response dated Nov. 25, 2014 to Final Rejection and Advisory Action and Pilot Program Request in U.S. Appl. No. 13/564,927.

(56) References Cited

OTHER PUBLICATIONS

Response dated Dec. 17, 2014 to Final Rejection and Second Advisory Action in U.S. Appl. No. 13/564,927.
Response resubmission dated Nov. 4, 2014 with Pilot Program Request in U.S. Appl. No. 13/564,927.
Second Advisory Action dated Dec. 12, 2014 with Interview Summary in U.S. Appl. No. 13/564,927.
Final Rejection dated Dec. 29, 2014 in U.S. Appl. No. 13/625,548.
Non-Final Office Action dated Jun. 13, 2014 in U.S. Appl. No. 13/625,548.
Response dated Sep. 15, 2014 to Non-Final Office Action in U.S. Appl. No. 13/625,548.
Non-Final Office Action dated Jul. 8, 2015 in U.S. Appl. No. 13/743,668.
Non-Final Office Action dated Jul. 2, 2014 in U.S. Appl. No. 13/803,892.
Non-Final Office Action dated Aug. 5, 2014 in U.S. Appl. No. 13/827,886.
Response dated Dec. 2, 2014 to Non-Final Office Action in U.S. Appl. No. 13/827,886.
Non-Final Office Action dated May 7, 2015 in U.S. Appl. No. 13/827,886.
Final Rejection dated May 21, 2014 in U.S. Appl. No. 13/957,884.
Applicant-Initiated Interview Summary dated Feb. 12, 2014 in U.S. Appl. No. 13/957,884.
Non-Final Office Action dated Nov. 8, 2013 in U.S. Appl. No. 13/957,884.
Response dated Feb. 4, 2014 to Non-Final Office Action in U.S. Appl. No. 13/957,884.
Response dated Mar. 3, 2014 to Applicant-Initiated Interview Summary in U.S. Appl. No. 13/957,884.
Applicant-Initiated Interview Summary dated Jan. 24, 2014 in U.S. Appl. No. 13/957,884.
Final Rejection dated Sep. 12, 2014 in U.S. Appl. No. 13/957,931.
Non-Final Office Action dated Mar. 21, 2014 in U.S. Appl. No. 13/957,931.
Response dated Jun. 19, 2014 to Non-Final Office Action in U.S. Appl. No. 13/957,931.
Response dated Nov. 12, 2014 to Final Rejection in U.S. Appl. No. 13/957,931 Along with Request for Consideration Under the After Final Pilot Program.
Advisory Action dated Dec. 3, 2014 in U.S. Appl. No. 13/957,931.
Non-Final Office Action dated Mar. 13, 2015 in U.S. Appl. No. 14/331,375.
Non-Final Office Action dated Apr. 21, 2015 in U.S. Appl. No. 14/331,422.
Response dated Jul. 20, 2015 to Non-Final Office Action in U.S. Appl. No. 14/331,422.
Non-Final Office Action dated Nov. 12, 2014 in U.S. Appl. No. 13/446,300.
Response dated Feb. 17, 2015 to Non-Final Office Action in U.S. Appl. No. 13/446,300.
Final Rejection dated May 21, 2015 in U.S. Appl. No. 13/446,300.
Response dated Jul. 21, 2015 to Final Rejection in U.S. Appl. No. 13/446,300.
Non-Final Office Action dated May 11, 2015 in U.S. Appl. No. 14/331,400.
Office Action dated Jul. 20, 2015 in Chinese Patent Application No. 201380017906.8.
Non-Final Office Action dated Aug. 10, 2015, from U.S. Appl. No. 14/044,050.
Non-Final Office Action dated Jul. 29, 2015, from U.S. Appl. No. 14/152,626.
RCE & Response to Office Action filed on Aug. 4, 2015, from U.S. Appl. No. 13/360,444.
Chinese Office Action dated Jul. 21, 2015, from Chinese patent application No. 201380006868.6.
Final Office Action dated Feb. 26, 2015, from U.S. Appl. No. 14/152,590.
Notice of Allowance dated Sep. 3, 2015, from U.S. Appl. No. 13/787,327.
Notice of Allowability dated Sep. 24, 2015, from U.S. Appl. No. 13/787,327.
Notification Concerning Transmittal of International Preliminary Report on Patentability (Chapter 1 of the PCT) dated Sep. 24, 2015, from International Application No. PCT/US2014/024868.
International Preliminary Report on Patentability (Chapter 1 of the PCT) dated Sep. 15, 2015, from International Application No. PCT/US2014/023416.
International Preliminary Report on Patentability (Chapter 1 of the PCT) dated Jul. 30, 2013, from International Application No. PCT/US2012/023006.
Notification of Transmittal of the International Search Report & The Written Opinion of The Internaional Searching Authority, or the Declaration dated Dec. 3, 2013, from International Application No. PCT/US2013/060172.
Supplementary European Search Report & Opinion dated Jun. 25. 2015, from European patent application No. 12739348.6.
Final Office Action dated Oct. 15, 2015, from U.S. Appl. No. 13/827,790.
Final Office Action dated Oct. 21, 2015, from U.S. Appl. No. 14/331,422.
Supplementary European Search Report dated Oct. 20, 2015, from EP Patent Application No. 13772707.9.
Supplementary European Search Report dated Oct. 22, 2015, from EP Patent Application No. 13741191.4.
Office Action dated Sep. 24, 2015, from EP Patent Application No. 10732230.7.
Non-Final Office Action dated Nov. 2, 2015, from U.S. Appl. No. 13/742,077.
Non-Final Office Action dated Jan. 12, 2016, in U.S. Appl. No. 14/152,590.
Non-Final Office Action dated Jan. 14, 2016, in U.S. Appl. No. 14/331,400.
Final Office Action dated Jan. 22, 2016, in U.S. Appl. No. 14/152,626.
Non-Final Office Action dated Dec. 18, 2015, in U.S. Appl. No. 14/081,504.
Response to Office Action filed Mar. 21, 2016, in U.S. Appl. No. 13/826,618.
Non-Final Office Action dated Mar. 28, 2016, in U.S. Appl. No. 13/446,300.
Non-Final Office Action dated Mar. 28, 2016, in U.S. Appl. No. 13/827,790.
Applicant-Initiated Interview Summary dated Sep. 19, 2016, in U.S. Appl. No. 14/152,626.
Preliminary Amendment filed Jul. 28, 2016, in U.S. Appl. No. 15/069,989.
Response to Restriction Office Action filed Jul. 28, 2016, in U.S. Appl. No. 14/852,656.
European Office Action dated Jul. 22, 2016, in European patent application No. 10807287.7.
European Office Action dated Jul. 22, 2016, in European patent application No. 10807285.1.
Final Office Action dated Jul. 29, 2016, in U.S. Appl. No. 14/331,400.
Notice of Allowance dated Jul. 11, 2016, in U.S. Appl. No. 13/826,618.
Final Office Action dated Jan. 23, 2017, issued in U.S. Appl. No. 14/081,715.
Notice of Allowance dated Jan. 25, 2017, issued in U.S. Appl. No. 14/152,626.
Non-Final Office Action dated Feb. 7, 2017, issued in U.S. Appl. No. 13/827,790.
Response to Office Action filed Feb. 6, 2017, in U.S. Appl. No. 13/360,444.
Response to Office Action filed Feb. 6, 2017, in U.S. Appl. No. 13/742,025.
Chinese Office Action dated Jan. 22, 2017, in Chinese patent application No. 201380006868.6.
Response to Office Action filed Feb. 7, 2017, in U.S. Appl. No. 14/852,656.

(56) References Cited

OTHER PUBLICATIONS

Certification and Request for Consideration Under the After Final Consideration Pilot Program and Amendment C and Response to Final Office Action, filed Oct. 31, 2016 for U.S. Appl. No. 14/331,400.
Response to Non-Final Office Action, filed Oct. 31, 2016, for U.S. Appl. No. 14/081,715.
Arguments in Support of Pre-Appeal Brief Request for Review, filed Nov. 8, 2016 for U.S. Appl. No. 14/044,050.
Non-Final Office Action dated Oct. 26, 2016 for U.S. Appl. No. 13/742,077.
Final Office Action for U.S. Appl. No. 13/446,300, dated Dec. 2, 2016.
Office Action for EP application No. 13741191.4, dated Dec. 2, 2016.
RCE and Response to Final Office Action for U.S. Appl. No. 14/152,590, dated Dec. 21, 2016.
Final Office Action for U.S. Appl. No. 13/826,618, dated Nov. 18, 2016.
RCE and Response to Final Office Action for U.S. Appl. No. 14/081,504, dated Dec. 9, 2016.
Response to Non Final Office Action for U.S. Appl. No. 14/152,626, dated Dec. 7, 2016.
Response to Non Final Office Action for U.S. Appl. No. 14/207,344, dated Dec. 9, 2016.
Japanese Office Action dated Sep. 16, 2016 (with translation), issued in Japanese patent application No. 2015-252820.
Non-Final Office Action dated Oct. 6, 2016, issued in U.S. Appl. No. 13/742,025.
Non-Final Office Action dated Oct. 7, 2016, issued in U.S. Appl. No. 14/852,656.
Non-Final Office Action dated Oct. 6, 2016, issued in U.S. Appl. No. 13/360,444.
Final Office Action dated Sep. 23, 2016, issued in U.S. Appl. No. 14/152.590.
Final Office Action dated Sep. 27, 2016, issued in U.S. Appl. No. 13/827,790.
Non-Final Office Action dated Aug. 26, 2016, in U.S. Appl. No. 14/858,619.
Amendment & Response to Office Action filed Aug. 29, 2016, in U.S. Appl. No. 13/446,300.
Final Office Action dated Jun. 1, 2017, from U.S. Appl. No. 14/852,656.
Examiner's Answer dated Jun. 5, 2017, from U.S. Appl. No. 14/044,050.
Response to Office Action filed Jun. 7, 2017, from U.S. Appl. No. 13/827,790.
Applicant Initiated Interview Summary for U.S. Appl. No. 13/826,618 dated Mar. 20, 2017.
Non Final Office Action in U.S. Appl. No. 13/826,618 dated Apr. 7, 2017.
Non Final Office Action in U.S. Appl. No. 14/207,344 dated Mar. 15, 2017.
Non Final Office Action in U.S. Appl. No. 14/631,909 dated Apr. 7, 2017.
Non Final Office Action in U.S. Appl. No. 15/069,989 dated Mar. 23, 2017.
Non Final Office Action in U.S. Appl. No. 14/204,466 dated Mar. 31, 2017.
Response to Non Final Office Action in U.S. Appl. No. 13/742,077 dated Mar. 27, 2017.
Non-Final Office Action dated Feb. 16, 2017, from U.S. Appl. No. 14/520,368.
Non-Final Office Action dated Mar. 9, 2017. from U.S. Appl. No. 15/069,988.
Non-Final Office Action dated Jun. 19, 2017, from U.S. Appl. No. 14/081,504.
Response to Office Action filed Jun. 15, 2017, in U.S. Appl. No. 14/207,344.
Non-Final Office Action dated Jun. 29, 2017, from U.S. Appl. No. 14/081,715.
Final Office Action dated Jun. 27, 2017, from U.S. Appl. No. 13/360,444.
Non-Final Office Action dated Jun. 23, 2017, from U.S. Appl. No. 13/749,823.
Non-Final Office Action dated Jul. 12, 2017, from U.S. Appl. No. 14/331,400.
Xiong, Joe, Fabrication of Ultrafine Fibrous Polytetrafluoroethylene Porous Membranes by Electrospinning Journal of Materials Research, 24(9), 2755-2761.
Menini, Richarad and Masoud Farzaneh, Production of Superhydrophobic Polymer Fibers With Embedded Particles Using the Electrospinning Technique, Polymer International 57:77-84, 2008.
Lee, K.H. et al. The Change of Bead Morphology Formed on Electrospun Polystyrene Fibers, Polymer 44 (2003), p. 4029-4034.
Response to Office Action filed Jul. 7, 2017, in U.S. Appl. No. 13/826,618.
Final Office Action dated Jul. 26, 2017, from U.S. Appl. No. 13/827,790.
Reply Brief filed Aug. 7, 2017, in U.S. Appl. No. 14/044,050.
RCE and Response to Office Action filed Aug. 14, 2017, in U.S. Appl. No. 13/742,025.
Response to Office Action filed Sep. 19, 2017, in U.S. Appl. No. 14/081,504.
Amendment A amd Response to Office Action filed Sep. 19, 2017, in U.S. Appl. No. 15/069,989.
Final Office Action dated Sep. 28, 2017, from U.S. Appl. No. 14/207,344.
Response to Office Action filed Sep. 29, 2017, in U.S. Appl. No. 14/081,715.
Notice of Allowance dated Oct. 4, 2017, in U.S. Appl. No. 14/204,466.
Response to Office Action filed Oct. 4, 2017, in U.S. Appl. No. 13/749,823.
Chinese Office Action dated Sep. 22, 2017, in Chinese Patent Application No. 201380006868.6.
Chinese Response to Office Action filed Oct. 10, 2017, in Chinese Patent Application No. 201410312160X.
Indian Response to Office Action filed Oct. 17, 2017, in Indian Patent Application No. 6058/DELNP/2011.
Final Office Action dated Oct. 16, 2017, from U.S. Appl. No. 13/749,823.
Indian Response to Office Action filed Oct. 20, 2017, in Indian Patent Application No. 1839/KOLNP/2012.
Final Office Action dated Oct. 20, 2017, from U.S. Appl. No. 13/826,618.
RCE and Response to Office Action filed Oct. 25, 2017, in U.S. Appl. No. 13/742,077.
Japanese Office Action dated Oct. 26, 2017, in Japanese Patent Application No. 2014-554841.
Non-Final Office Action dated Nov. 1, 2017, from U.S. Appl. No. 13/446,300.
RCE and Response to Office Action filed Oct. 26, 2017, in U.S. Appl. No. 13/360,444.
Non-Final Office Action dated Nov. 3, 2017, from U.S. Appl. No. 14/967,597.

\* cited by examiner

ELECTROSPINNING OF PTFE

CROSS-REFERENCE TO RELATED APPLICATION

The present application is a continuation application of U.S. application Ser. No. 13/446,300, filed Apr. 13, 2012; which application is a continuation application of U.S. application Ser. No. 12/689,334, filed Jan. 19, 2010, now U.S. Pat. No. 8,178,030, issued May 15, 2012; which application claims priority to U.S. Provisional Patent Application No. 61/145,309, filed Jan. 16, 2009, and U.S. Provisional Patent Application No. 61/256,349, filed Oct. 30, 2009; all of which are incorporated by reference.

BACKGROUND OF THE INVENTION

The present invention is specific to a process of electrospinning polytetrafluoroethylene (PTFE). More particularly, the present invention is related to electrospinning high viscosity PTFE dispersions and products manufactured thereby.

The process of electrostatic spinning is well known in the art as represented in U.S. Pat. Nos. 2,158,416; 4,043,331; 4,143,196; 4,287,139; 4,432,916; 4,689,186; 6,641,773 and 6,743; 273 each of which is incorporated herein by reference thereto. U.S. Pat. Nos. 4,323,525, 4,127,706 and 4,044,404, all of which are incorporated herein by reference, provide information related to processing and electrostatic spinning of PTFE from an aqueous or other dispersion.

Electrostatic spinning, also referred to in the art as electrospinning, involves a charged polymer moving towards a charged surface. In one embodiment the polymer is discharged through a small charged orifice, such as a needle, towards a target wherein the needle and target have opposing electrical charge. As would be realized, the nature of the polymer is critical. It has long been considered necessary in the art to maintain a relatively low viscosity of less than about 150 poise with viscosity being relatively higher for lower molecular weight polymers and relatively lower for higher molecular weight polymers. If the combination of viscosity and molecular weight were too high the fiberization was considered to be inadequate.

It has long been considered undesirable to increase the viscosity of the polymer solution over about 150 poise due to thixotropic limitations which cause orifice clogging, poor fiber formation, and the like. Furthermore, when a charged orifice is used the polymer fibers repel during flight which has long been believed to limit the number of fibers within a given volume of spray. Through diligent research the present inventors have determined, contrary to prior understandings, that a significant increase in viscosity to well above that previously considered feasible, actually improves the resulting material and provides additional properties and advantages not previously considered possible.

SUMMARY

It is an object of the invention to provide an improved process for electrospinning PTFE.

It is another object of the invention to provide a method to provide superior products based on electrospun PTFE.

A particular feature of the present invention is the ability to utilize existing electrospinning techniques, and facilities, while providing an improved product.

These and other advantages, as will be realized, are provided in a process for forming a PTFE mat. The process includes providing a dispersion with PTFE, a fiberizing polymer and a solvent wherein said dispersion has a viscosity of at least 50,000 cP. An apparatus is provided which comprises a charge source and a target a distance from the charge source. A voltage source is provided which creates a first charge at the charge source and an opposing charge at the target. The dispersion is electrostatically charged by contact with the charge source. The electrostatically charged dispersion is collected on the target to form a mat precursor which is heated to remove the solvent and the fiberizing polymer thereby forming the PTFE mat.

Yet another advantage is provided in a process for forming a PTFE mat. The process includes providing a dispersion comprising PTFE with a particle size of at least 0.1 microns to no more than 0.8 microns; 1 wt % to no more than 10 wt % of polyethylene oxide with a molecular weight of at least 50,000 to no more than 4,000,000; and a solvent wherein said dispersion has a viscosity of at least 50,000 cP. An apparatus is provided comprising an orifice and a target a distance from the orifice. A voltage source is provided to create a first charge at the orifice and an opposing charge at the target. The dispersion is forced through the orifice wherein the dispersion is electrostatically charged by contact with the orifice. Electrostatically charged dispersion is collected on the target to form a mat precursor which is heated to remove the solvent and the fiberizing polymer thereby forming the PTFE mat.

DETAILED DESCRIPTION

The present invention is directed to a process for the electrostatic spinning of polytetrafluoroethylene (PTFE) into continuous fibers for the formation of non-woven sheets, membranes, tubes, and coatings with potential for multiple other applications and forms. In particular, the present invention is directed to electrospinning PTFE at a very high viscosity relative to the prior art in direct contrast to that which was previously considered feasible.

Figure 1:
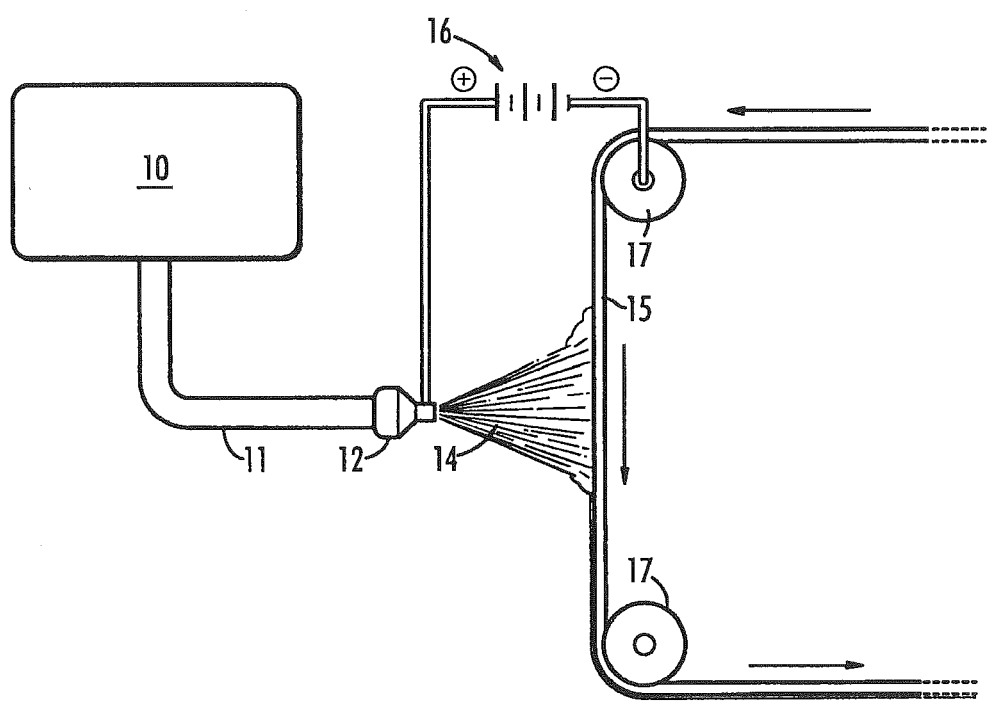
FIG. 1 schematically illustrates electrodeposition.

An electrostatic spinning apparatus is illustrated schematically in FIG. 1. In FIG. 1 a reservoir, 10, is loaded with a high viscosity dispersion as further described herein. A delivery system, 11, delivers the dispersion from the reservoir to a charge source, 12, which may be an orifice. A target, 15, is set some distance from the charge source, 12. A power source, 16, such as a DC power supply establishes an electrical charge differential between the charge source and target such that polymeric material, 14, is electrically charged opposite the target. The polymeric material is electrostatically attracted to the target and is deposited thereon. The target may be static, in motion or it may be a continuous, or near continuous, material which moves through the zone of polymer impact, such as by movement on transport rollers, 17, or the like. In one embodiment the electrical charge, or ground as illustrated, is applied to the roller which is in electrically conductive contact with the target. The target may be a continuous loop or it may initiate on a delivery device, such as a supply spool and be taken up by a collector, such as a receiver spool. In an alternative embodiment the charge source and target may be in a common dispersion bath.

The instant process requires a dispersion or suspension of a sufficient percentage of PTFE solids to aid in the post processing of the collected fibrous mat into a form that has some mechanical integrity. If the PTFE solid content in the dispersion is too low, there will be no, or poor, mechanical integrity to the resulting material. Second, the selection of the polymer used to increase the viscosity of the solution, suspension or dispersion, also referred to as a fiberization polymer, to be spun must be selected carefully. We have found that too low of a molecular weight fiberization polymer added to the PTFE will cause poor performance and poor handling characteristics. It is also believed that too high of a molecular weight will cause an increase in the viscosity without enough of the polymer being present to actually bind the PTFE powder together during the electrospinning and curing process. Additionally, the process used to sinter the PTFE powder together must be finely controlled such that the resulting product has good mechanical integrity.

It is preferred that the PTFE have a molecular weight of $10^6$ to $10^8$.

It is preferred that the PTFE have a particle size of at least 0.1 microns to no more than 0.8 microns. More preferably, the PTFE has a particle size of at least 0.2 microns to no more than 0.6 microns. Below a particle size of 0.1 microns the materials create manufacturing difficulties. Above a particle size of 0.8 microns the particle size approaches the target fiber diameter and becomes a defect in the fiber. For other applications larger sizes may be suitable for use.

The process for producing a non-woven PTFE material will be described with reference to FIG. 2. An aqueous dispersion of a narrow particle size distribution PTFE powder is prepared, 20. A fiberizing polymer is added, 22, to the dispersion. Preferably, the fiberizing polymer is added in an amount of between 1 and 10 wt %, more preferably about 2 to 7 wt % with about 4-5 wt % being most preferred. The fiberizing polymer preferably has a high solubility in the solvent, which is preferably water, with a solubility of greater than about 0.5 wt % being preferred. It is preferable that the fiberizing polymer has an ash content of less than about 5 wt %, when sintered at about 400° C., with even lower being more preferred.

Particularly preferred fiberization polymers include dextran, alginates, chitosan, guar gum compounds, starch, polyvinylpyridine compounds, cellulosic compounds, cellulose ether, hydrolyzed polyacrylamides, polyacrylates, polycarboxylates, polyvinyl alcohol, polyethylene oxide, polyethylene glycol, polyethylene imine, polyvinylpyrrolidone, polyacrylic acid, poly(methacrylic acid), poly(itaconic acid), poly(2-hydroxyethyl acrylate), poly(2-(dimethylamino)ethyl methacrylate-co-acrylamide), poly(N-isopropylacrylamide), poly(2-acrylamido-2-methyl-1-propanesulfonic acid), poly(methoxyethylene), poly(vinyl alcohol), poly(vinyl alcohol) 12% acetyl, poly(2,4-dimethyl-6-triazinylethylene), poly(3-morpholinylethylene), poly(N-1,2,4-triazolyethylene), poly(vinyl sulfoxide), poly(vinyl amine), poly(N-vinyl pyrrolidone-co-vinyl acetate), poly(g-glutamic acid), poly(N-propanoyliminoethylene), poly(4-aminosulfo-aniline), poly[N-(p-sulphophenyl)amino-3-hydroxymethyl-1,4-phenyleneimino-1,4-phenylene)], isopropyl cellulose, hydroxyethyl, hydroxylpropyl cellulose, cellulose acetate, cellulose nitrate, alginic ammonium salts, i-carrageenan, N-[(3'-hydroxy-2,3'-dicarboxy)ethyl]chitosan, konjac glocomannan, pullulan, xanthan gum, poly(allyammonium chloride), poly(allyammonium phosphate), poly(diallydimethylammonium chloride), poly(benzyltrimethylammonium chloride), poly(dimethyldodecyl(2-acrylamidoethyly)ammonium bromide), poly(4-N-butylpyridiniumethylene iodine), poly(2-N-methylpridiniummethylene iodine), poly(N methyl-pryidinium-2,5-diylethenylene), polyethylene glycol polymers and copolymers, cellulose ethyl ether, cellulose ethyl hydroxyethyl ether, cellulose methyl hydroxyethyl ether, poly(1-glycerol methacrylate), poly(2-ethyl-2-oxazoline), poly(2-hydroxyethyl methacrylate/methacrylic acid) 90:10, poly(2-hydroxypropyl methacrylate), poly(2-methacryloxyethyltrimethylammonium bromide), poly(2-vinyl-1-methylpyridinium bromide), poly(2-vinylpyridine N-oxide), poly(2-vinylpyridine), poly(3-chloro-2-hydroxypropyl-2-methacryloxyethyldimethylammonium chloride), poly(2-vinylpyridine N-oxide), poly(2-vinylpyridine), poly(acrylamide/2-methacryloxyethyltrimethylammonium bromide) 80:20, poly(acrylamide/acrylic acid), poly(allylamine hydrochloride), poly(butadiene/maleic acid), poly(diallyldimethylammonium chloride), poly(ethyl acrylate/acrylic acid), poly(ethylene glycol)bis(2-aminoethyl), poly(ethylene glycol)monomethyl ether, poly(ethylene glycol)-bisphenol A diglycidyl ether adduct, poly(ethylene oxide-b-propylene oxide), poly(ethylene/acrylic acid) 92:8, poly(1-lysine hydrobromide), poly(1-lysine hydrobromide), poly(maleic acid), poly(n-butyl acrylate/2-methacryloxyethyltrimethylammonium bromide), poly(N-iso-propylacrylamide), poly(N-vinylpyrrolidone/2-dimethylaminoethyl methacrylate), dimethyl sulfatequaternary, poly(N-vinylpyrrolidone/vinyl acetate), poly(oxyethylene)sorbitan monolaurate (Tween 20®), poly(styrenesulfonic acid), poly(vinyl alcohol), N-methyl-4(4'-formylstyryl)pyridinium, methosulfate acetal, poly(vinyl methyl ether), poly(vinylamine)hydrochloride, poly(vinylphosphonic acid), poly(vinylsulfonic acid) sodium salt and polyaniline.

A particularly preferred fiberizing polymer is polyethyleneoxide (PEO) with a molecular weight of 50,000-4,000,000 and more preferably a molecular weight of about 250,000 to 350,000 and most preferably a molecular weight of about 300,000.

Figure 2:
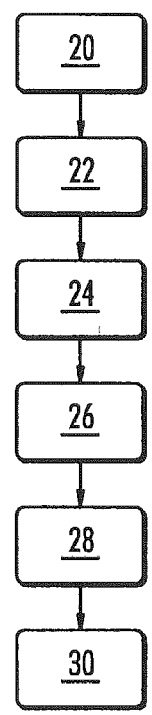
FIG. 2 schematically illustrates the inventive process.

With further reference to FIG. 2, after mixing the PTFE and fiberizing polymer dispersion is preferably allowed to homogenize, 24. In a particularly preferred method the polymer dispersion is allowed to form slowly, without agitation, followed by transfer to a jar roller that will turn it at a constant rate for several more days. It is preferred to create a uniform solution that has little to no air trapped in the resulting highly viscous mixture. Once the dispersion is of uniform consistency it is preferably filtered to remove any clumps or gels. The filtered dispersion with the desired viscosity is then loaded, 26, in a controlled pumping device with a fixed conductive element which acts as the charge source. A particularly preferred conductive element is an orifice such as a 16 gauge needle that has been cut blunt and sanded to remove any burs. The ejection volume from the pumping device is set to a predetermined rate that is dependent on the form being made and the desired fiber diameters. The charge source is preferably connected to the positive side of a precision DC power supply. The negative side of the power supply is preferably connected to the collection surface or target. The polarity can be reversed but this is not preferred.

The target surface can be a drum, device or sheet. The surface can be a metal, ceramic or polymeric material with particularly preferred materials selected from stainless steel, cobalt chrome, nickel titanium (nitinol), magnesium alloys polyactides, polyglycolides, polyhydroxyl butyrates, polyhydroxyalkynoates, polydioxinine, polyetheretherketone (PEEK), polyurethanes, polycarbonates and polyethyleneoxide. The voltage on the power supply is increased to the desired voltage to uniformly draw out the polymer/PTFE solution.

The applied voltage is typically from 2,000-80,000 volts. The charge induced by the connection of the power supply repels the charged polymer away from the charge source and attracts them to the collection surface.

The collection target is preferably placed perpendicular to the pump and orifice system and is moved in at least one direction such that the entire surface is uniformly covered, 28, with the fibers drawn towards the target. Once the collection surface has been adequately covered the material is preferably cured/sintered, 30, either in place, by placing the entire collection surface in an oven, or by removing the sheet tube or other form from the collection surface and sintering it in an oven.

Electrospun PTFE fabrics undergo shrinkage upon sintering. While not limited to any theory the shrinkage is believe to occur in two steps. Initially, the fibers and fabrics, as spun, contain both water and a fiberizing polymer, preferably polyethyleneoxide. Upon completion of spinning the samples dry and undergo a small degree of fiber rearrangement. The samples are sintered by exposing the fibers and fabrics to temperatures of 550° to 900° F. for a period of time such that the water and fiberizing polymer are evaporated. The evaporation is hypothesized to generate a second, more significant, shrinkage. Cracking of the fabric and breaking of the fibers is believed to occur during this second shrinkage when the fabric has not been allowed to relax.

To accommodate for shrinkage, the fiber and fabrics can be spun onto an expanded structure. The structure can then be removed or contracted. This allows the fabric to shrink during sintering without cracking. Another method involves spinning the fibers and fabrics onto a structure which can then be expanded or contracted prior to sintering. The range of contraction or expansion and contraction is preferably on the order of 3 to 100% and depends upon the thickness and size of the electrodeposited fabric mat.

For a sheet of fabric, if the direction of the deposition is given as the perpendicular to the plane of the fabric then contraction or expansion/contraction must occur in at least one or more of the directions in the plane of the fabric. For a fabric deposited upon a cylindrical surface the fabric must be contracted or contracted/expanded radially and/or longitudinally. For a spherical surface the fabric must be contracted or contracted/expanded radially. These basic concepts of contraction and/or expansion/contraction can be applied to any electrospun fabric independent of the shape of the surface upon which it was spun. Thus, very complex fabric shapes based upon PTFE fabric become possible.

In a particularly preferred embodiment a high viscosity material is used. It is surprising that superior properties are observed by electrospinning a material with a viscosity of at least 50,000 cP to no more than 300,000 cP. More preferably the viscosity is at least 100,000 cP to no more than 250,000 and most preferably the viscosity is at least 150,000 cP no more than 200,000 cP. Above a viscosity of 300,000 cP it becomes increasingly difficult to generate a fiber.

In one embodiment electrospinning dispersions are based upon Daikin D 210 PTFE and Sigma Aldrich polyethylene oxide with a molecular weight of 300,000. Daikin D 210 PIFE is representative of a material suitable for demonstrating the invention. Daikin D 210 PTFE has about 59-62 wt % solids, 6.0-7.2% wt % surfactant, a pH of 8.5 to 10.5, a specific gravity of 1.5 to 1.53 and a Brookfield viscosity maximum of 35 cP.

The dispersion has a preferred PTFE percent solids, by weight, of 50%-80%, more preferably 55-65 wt %, and even more preferably 59-61 wt %. The specific gravity is preferably 1.5 to 1.54 and more preferably 1.51. By way of example, a 1000 ml dispersion would have a weight range of 1500 gm to 1530 gm with 885 gm to 933.3 gm of PTFE.

A particularly preferred embodiment has 60% PTFE solids, a specific gravity of 1.51, with 909 gm of PTFE per 1000 ml of dispersion.

A particularly preferred example is prepared with from 32 gm to 52 gm fiberizing polymer, most preferably PEO, per 1000 ml of the Daikin D 210 dispersion which provides a ratio of fiberizing polymer solids to PTFE dispersion (such as PEO/PTFE) of from 0.032 to 0.052 gm/ml PEO in the 1000 ml of dispersion. Fiberizing polymer ratios, below 0.03 gm/ml by weight, results in very poor quality and non-uniform fiber mat formation. Poor quality is defined as the existence of high levels of fiber breakage, >20%, and the formation of non-uniform fiber diameters which are also referred to in the art as "beading". The existence of broken fibers and/or non-uniform fibers results in non-uniform porosity within the fibrous mat. The presence of broken fibrils, especially short fibrils, leads to decreased efficiency over time as the non-continuous fibrils are pulled from the mat.

A PTFE dispersion of 60% PTFE solids and PEOs ranging between 200,000 and 4,000,000 Mw is representative. Fiberizing polymer to PTFE ranges of 0.03 to 0.06 for fiberizing polymer being PEO with a molecular weight of 300,000 is particularly representative.

Viscosities for different formulations of PEO/PTFE at a constant spindle speed setting of 2.5 for a #25 spindle at 25° C. taken in a Brookfield LV Viscometer are provided in Table 1.

TABLE 1

| Sample | Torque (%) | Viscosity (cp) |
| --- | --- | --- |
| 0.052 gm/ml PEO | 88.5 | 171,000 |
| 0.048 gm/ml PEO | 76.8 | 147,000 |
| 0.044 gm/ml PEO | 79.2 | 152,000 |
| 0.040 gm/ml PEO | 58.5 | 112,000 |
| 0.036 gm/ml PEO | 40.1 | 77,000 |
| 0.032 gm/ml PEO | 34.5 | 66,000 |

Assuming 909 gm PTFE in 1000 ml of the Diakin D 210 dispersion the preferred percent PEO/PTFE dispersion range is from 0.032 to 0.060 gm/ml. About 0.048 gm/ml is particularly preferred for demonstrating the invention.

For deposition a charged needle and a grounded target is preferred and relied on herein unless otherwise specified. This has been accepted as a standard practice within the industry partially for safety reasons. A grounded needle and a charged target can be used but this is not preferred since the result is inferior material.

Voltages of 11, 14, or 17 kV with corresponding distances from tip to top of target (TTT) of 4.5", 5.5", and 6.5" were relied on for convenience for the samples set forth herein. Voltages and distances are design choices based on experimental apparatus employed the determination of which is well known to those of skill in the art. For the purposes of demonstration, samples were deposited onto foil, dried and then sintered at 725° F. for five minutes then examined by SEM. The process produced a smooth, heavy, wide web indicating a significant improvement in material transfer efficiency. Test results using reverse polarity were inferior. A mat was deposited that was about 5" wide.

Visual observation showed various levels of degradation in samples produced by reverse polarity. In addition, the photomicrographs showed breakage of fibers as well as a twisting of fibers to create fiber bundles. There was also a wide distribution of fiber and fiber bundle diameters. All of these fiber characteristics will result in an inconsistent and poor quality fiber mat. These fiber characteristics are consistent with poor fiber mat quality observed with our attempts to espin from low PEO/PTFE concentration dispersions. High voltages and tip-to-target distances 5.5 and 6.5", showed the most fiber breakage whereas the 4.5" TTT distance showed the most bundling.

When "normal" e-spun PTFE was examined under high magnification there was no apparent fiber breakage, all fibers were of uniform diameter and fiber mats survived the sintering process.

Representative results are provided in Tables 2-4 with standard deviations reported in parenthesis. In the Tables the air flow, pore diameter, and bubble point were measured using a Porous Materials, Inc. Capillary Flow Porometer Model CFP-1100-AEXL using test type "Dry Up/Wet Up".

Density was measured by a gas pycnometer using ISO 1183-3. Tensile, elongation, and modulus were measured using ASTM D882 with diecut ASTM D638 Type V dogbone sample geometry. Viscosities for different formulations of PEO/PTFE were done at the constant spindle speed setting listed for a #25 spindle at 25° C. taken in a Brookfield LV Viscometer.

A particular advantage offered by the present process is that the resulting material has significantly fewer broken fibrils upon sintering than a sample of the prior art. A decrease in fibril breakage increases manufacturing productivity due to a decrease in the material which is inferior. This is achieved without a loss of product characteristics.

The invention has been described with reference to the preferred embodiments without limit thereto. One of skill in the art would realize additional embodiments and improvements which are within the meets and bounds of the invention which are more specifically set forth in the claims appended hereto.

TABLE 2

Physical Properties of PTFE Membranes 60% PTFE, 0.048 gm/ml PEO/1000 ml PTFE dispersion.

| Examples | 1 | 2 | 3 | 4 | 5 |
|---|---|---|---|---|---|
| Viscosity (cP) | 147,000 | 147,000 | 147,000 | 147,000 | 147,000 |
| Thickness (mil) | 0.2 (0.08) | 0.5 (0.05) | 1.1 (0.24) | 1.02 | 3.33 |
| Spindle setting | 2.5 | 2.5 | 2.5 | 2.5 | 2.5 |
| Density (g/cm3) | 0.3549 | 0.3227 | 0.4342 | | 0.4239 |
| Basis Weight (g/cm2) | 2.9605 | 8.0807 | 10.773 | 33.7 | 35.888 |
| BP: Pore diameter (microns) | 9.17 (0.787) | 3.18 (0.157) | 3.01 (0.123) | 3.41 (0.235) | 2.63 (0.088) |
| Bubble point: Pressure (psi) | 0.72 (0.062) | 2.08 (0.102) | 2.2 (0.089) | 1.94 (0.138) | 2.52 (0.082) |
| Air Flow (micron) | | | | 1.4217 | |
| Density(g/cm3) | 2.0871 | 2.2334 | 2.2022 | 2.2255 | 2.1985 |
| Tensile Strength (psi) | 190 (58.1) | 339 (15) | 348 (86.9) | 1450 (290) | 208 (19.9) |
| Modulus (psi) | 1420 (395) | 1560 (45.8) | 1910 (143) | 3650 (1100) | 1594 (235) |
| Elongation (%) | 110 (23) | 190 (13) | 140 (28) | 255 (38) | 130 (14.6) |

TABLE 3

Physical Properties of PTFE Membranes 67% PTFE, 0.015 to 0.040 gm/ml PEO/1000 ml PTFE dispersion.

| Examples | 6 | 7 | 8 | 9 | 10 |
|---|---|---|---|---|---|
| Viscosity (cP) | 129,000 | | | 249,000 | <500,000 |
| Spindle setting | 2.5 | 2.5 | 2.5 | 2.0 | 2.5 |
| PEO/PTFE (g/ml) | 0.015 | 0.02 | 0.025 | 0.030 | 0.040 |
| Thickness (mil) | 2.7 | 2.2 | 2.5 | 1.5 | 1.0 |
| Density (g/cm3) | 0.4949 | 0.5973 | 0.5331 | 0.3854 | 0.2521 |
| Basis Weight (g/cm2) | 18.745 | 12.385 | 24.371 | 12.767 | 4.681 |
| BP: Pore diameter (microns) | 4.14 | 3.95 | 5.09 | 4.05 | 6.7 |
| Bubble point: Pressure (psi) | 1.59 | 1.68 | 1.30 | 1.63 | 0.935 |
| Air Flow (micron) | 1.4806 | 1.5747 | 1.9938 | 1.8346 | 3.0425 |

TABLE 3-continued

Physical Properties of PTFE Membranes 67% PTFE,
0.015 to 0.040 gm/ml PEO/1000 ml PTFE dispersion.

| Examples | 6 | 7 | 8 | 9 | 10 |
|---|---|---|---|---|---|
| Density (g/cm3) | 2.2139 | 2.1978 | 2.2077 | 2.1904 | |
| Tensile Strength (psi) | 371.37 | 626.76 | 321 | 109 | 114.47 |
| Modulus (psi) | 2430 | 3381.8 | 1380 | 2300 | 1220 |
| Elongation (%) | 106.33 | 114.27 | 126.77 | 121.92 | 68 |

TABLE 4

Physical Properties of PTFE Membranes 72% PTFE,
0.020 to 0.030 gm/ml PEO/1000 ml PTFE dispersion.

| Examples | 11 | 12 | 13 |
|---|---|---|---|
| PEO/PTFE (g/ml) | 0.02 | 0.025 | 0.030 |
| Thickness (mil) | 1.8 | 2.3 | 1.5 |
| Density (g/cm3) | 0.3504 | 0.2972 | 0.4110 |
| Basis Weight (g/cm2) | 13.795 | 13.320 | 10.442 |
| BP: Pore diameter (microns) | 7.14 | 9.15 | 5.7223 |
| Bubble point: Pressure (psi) | 0.92 | 0.76 | 1.09 |
| Air Flow (micron) | 3.3837 | 3.1946 | 2.6542 |
| Density (g/cm3) | 2.2236 | 2.1845 | 2.2182 |
| Tensile Strength (psi) | 218.57 | 103.99 | 335 |
| Modulus (psi) | 1610 | 764 | 2790 |
| Elongation (%) | 86.42 | 48 | 110 |

What is claimed is:

1. A method of preparing a spinning dispersion, comprising: adding a fiberizing polymer to a polytetrafluoroethylene (PTFE) aqueous dispersion to form a PTFE/Polymer dispersion, wherein the PTFE/Polymer dispersion comprises at least 1% by weight of the fiberizing polymer in relation to weight of the PTFE/Polymer dispersion to no more than 10% by weight of the fiberizing polymer in relation to weight of the PTFE/Polymer dispersion, and wherein the PTFE/Polymer dispersion has a viscosity of at least 50,000 cP.

2. The method of claim 1, wherein the PTFE/Polymer dispersion comprises 50-80 wt % PTFE solids.

3. The method of claim 2, wherein the PTFE/Polymer dispersion comprises 59-61 wt % PTFE solids.

4. The method of claim 1, wherein the PTFE/Polymer dispersion comprises a weight ratio of fiberizing polymer to PTFE/Polymer dispersion of at least 3.0 to no more than 5.5.

5. The method of claim 1, wherein the fiberizing polymer comprises polyethylene oxide (PEO), the PTFE/Polymer dispersion comprises a PTFE/PEO dispersion, and wherein the ratio of PEO to PTFE corresponds to a ratio in the range of 0.03 to 0.06 grams of PEO per ml of 60 wt % PTFE dispersion.

6. The method of claim 5, wherein the ratio of PEO to PTFE corresponds to a ratio of between 0.032 and 0.052 grams of PEO per ml of 60 wt % PTFE dispersion.

7. The method of claim 6, wherein the ratio of PEO to PTFE corresponds to a ratio of about 0.048 grams of PEO per ml of 60 wt % PTFE dispersion.

8. The method of claim 5, further comprising mixing the PTFE/PEO dispersion in a jar roller turning at a constant rate.

9. The method of claim 8, wherein mixing the PTFE/PEO dispersion comprises mixing in a jar roller turning at a constant rate for at least 24 hours.

10. The method of claim 5, further comprising filtering PTFE/PEO dispersion to remove clumps.

11. The method of claim 5, further comprising allowing the PTFE/PEO dispersion to homogenize.

12. The method of claim 1, wherein a molecular weight of the fiberizing polymer is 200,000 to 4,000,000 Mw.

13. The method of claim 1, wherein the spinning dispersion is spun to create one or more fibers, the one or more fibers having a diameter of about 0.8 microns.

14. The method of claim 1, wherein PTFE particles dispersed in the spinning dispersion have a particle size of no more than 0.8 microns.

15. The method of claim 1, wherein PTFE particles dispersed in the spinning dispersion have a particle size of at least 0.1 microns.

16. The method of claim 1, wherein PTFE particles dispersed in the spinning dispersion have a particle size in a range of 0.2 microns to 0.6 microns.

* * * * *